United States Patent [19]

Sheets

[11] 3,838,502

[45] Oct. 1, 1974

[54] METHOD OF ENCAPSULATING RANDOM WOUND STATOR COILS FOR A DYNAMOELECTRIC MACHINE

[75] Inventor: Marvin William Sheets, Los Gatos, Calif.

[73] Assignee: General Electric Company, Schenectady, N.Y.

[22] Filed: Oct. 16, 1973

[21] Appl. No.: 406,778

[52] U.S. Cl. ............... 29/596, 29/605, 29/606, 310/45, 310/208
[51] Int. Cl. ............................ H02k 15/14
[58] Field of Search ...... 29/596, 605, 606; 310/208, 310/42, 45; 156/53, 56

[56] References Cited
UNITED STATES PATENTS

| | | |
|---|---|---|
| 3,431,639 | 3/1969 | Reimer et al. ............... 29/596 X |
| 3,436,815 | 4/1969 | Sheets ............... 29/596 X |
| 3,662,199 | 5/1972 | Anderson et al. ............... 310/208 |

Primary Examiner—Charles W. Lanham
Assistant Examiner—Carl E. Hall
Attorney, Agent, or Firm—Vale P. Myles

[57] ABSTRACT

A method is provided for mounting the sides of random wound stator coils in relatively stiff, straight-sided slot tubes so that the coils are easier to handle and safer from damage to their insulation when the coils are being mounted in stator slots of a dynamoelectric machine.

14 Claims, 4 Drawing Figures

PATENTED OCT 1 1974 3,838,502

- POSITION SLOT TUBES AROUND 2 SIDES OF RANDOM WOUND COILS.
- WIND POROUS INSULATING TAPE AROUND ENDS OF COILS AND OVER ENDS OF SLOT TUBES.
- WIND POROUS TAPE AROUND SLOT TUBES.
- MOUNT COILS IN SLOTS OF A STATOR.
- IMPREGNATE COILS WITH VISCOUS THERMOSETTING RESIN.
- CURE RESIN.

METHOD OF ENCAPSULATING RANDOM WOUND STATOR COILS FOR A DYNAMOELECTRIC MACHINE

BACKGROUND OF THE INVENTION

It is known in the prior art to provide rigid coil insulation for random wound coils after they are inserted into the coil-receiving slots of a dynamoelectric machine core. A major advantage of such a manufacturing method is that it enables the use of relatively inexpensively formed and easily manipulated random wound coils in the manufacture of such machines, which are the same time affording a rigid coil mounting arrangement analogous to that normally associated with stiffer, form wound coils. An example of a desirable encapsulation process for rigidly insulating a random wound coil in a motor stator is shown in U.S. Pat. No. 3,436,815-Sheets, which issued on Apr. 8, 1969 and is assigned to the assignee of the present invention. In prior art manufacturing processes of the type disclosed in that patent, the sides of the coils are sufficiently flexible during their assembly into station slots to enable the strands of magnetic wire of the coils to be formed during and after the insertion into the slots. It has been found during the practice of the invention disclosed in that earlier patent that there is some risk of damaging the magnetic wire insulation when the relatively flexible coils are inserted into the sharp edged stator slots. Thus, it is now recognized that it would be desirable to provide some better means for retaining the advantages of the random-wound coil encapsulation method while at the same time, avoiding the risk of damaging the coils during their assembly.

Many different techniques have been adopted in the past to protect the winding insulation of dynamoelectric machine coils from damage during either their assembly or the subsequent normal operation of the machine on which the coils are mounted. One common method, particularly in the case of form wound coils, is to position slot tubes formed of a suitable insulating board or impregnated sheeting material in the stator slots of the machine before the sides of the coil windings are inserted into the slots. Another known procedure is to encapsulate the individual machine coils in a rigid insulating material that supports the individual strands of magnetic wire and also protects them from injury due to mechanical causes during the assembly of the coils into a machine stator. One example of such a rigidly encapsulated coil winding is shown in U.S. Pat. No. 2,856,547-Saums, which issued on Oct. 14, 1958. Accordingly, these kinds of rigid encapsulating techniques are suitable for use with large, form-wound stator coils, they necessarily sacrifice the desirable flexibility afforded by random wound coils. Accordingly, in those cases where random wound coils are used on relatively small dynamoelectric machines to facilitate the convenient assembly of the flexible windings into the sometimes restricted mouths of stator slots, such rigid encapsulating techniques are not acceptable.

A primary object of the present invention is to provide a method of manufacturing a stator for a dynamoelectric machine which retains the advantages afforded by using random wound stator coils, while incorporating means for rendering the sides of the random wound coils more rigid and easy to handle and better protected from damage due to mechanical causes during the assembly of the coils into the stator slots.

Another object of the invention is to provide a method of making a random wound coil for a dynamoelectric machine, which coil possesses the advantages of relative flexibility inherent in random wound coils while also affording the convenience of ease in handling normally associated with form wound coils.

A further object of the invention is to provide a method of manufacturing a random wound coil for a dynamoelectric machine wherein the sides of the coil adapted to be inserted in the coil-receiving core slots of the machine are positioned within slot tubes that are closed tightly around the coil sides to hold them in a generally straight configuration prior to their insertion into the core slots.

Yet another object of the invention is to provide a method for holding slot tubes in a closed position around the sides of a random wound coil prior to the insertion of the coil into the core slots of a dynamoelectric machine.

Additional objects and advantages of the invention will be apparent to those skilled in the art from the description of the invention that is presented herein, taken in conjunction with the accompanying drawings.

SUMMARY OF THE INVENTION

In one preferred embodiment of the invention, a method of manufacturing a dynamoelectric machine core member is provided wherein opposite sides of individual random wound coils are mounted in tightly closed insulating slot tubes prior to the assembly of the coils into the core slots of the machine. Preferably, the slot tubes are held in their closed position by a butt-wound tape extending over the length of the slot tubes and a lap-wound porous tape is positioned around each of the ends of the tubes and the end portions of the random wound coils. Subsequently, the coils are positioned in the slots of a dynamoelectric machine core and encapsulated with a suitably filled thermosetting resin that is then cured to form a rigid body of insulation around the strands of magnetic wire comprising each of the coils.

DESCRIPTION OF THE PREFERRED EMBODIMENT

Figure 1:
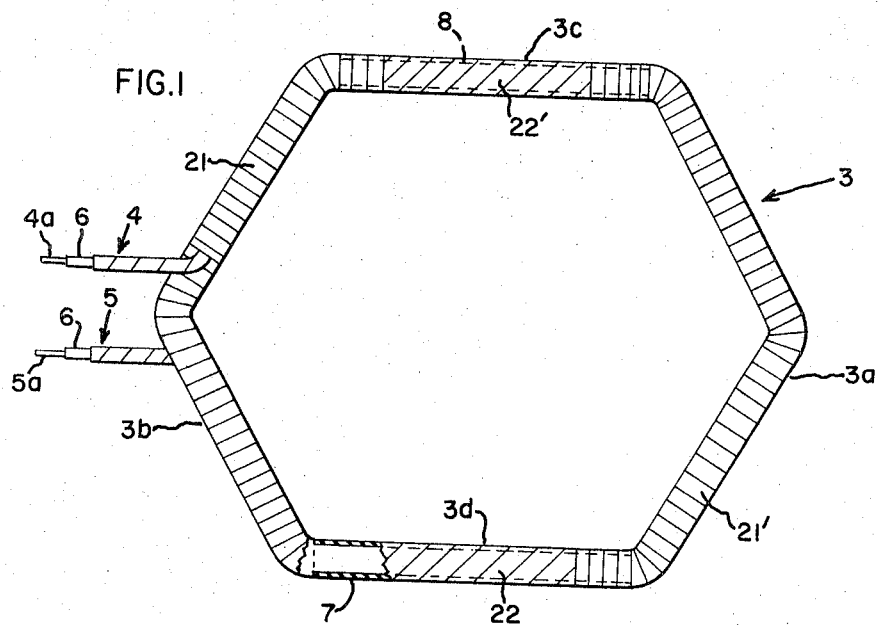
FIG. 1 is a top plan view, partly in cross-section, of a dynamoelectric machine coil that is constructed pursuant to the teachings of the present invention.
Figure 2:
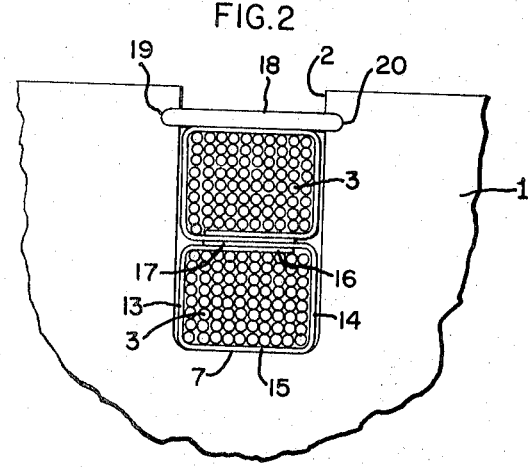
FIG. 2 is an end view of one side of two random wound coils, such as the coil shown in FIG. 1, illustrated with respect to a portion of a dynamoelectric machine core including a core slot and slot wedge that are adapted to house and confine the sides of the illustrated coils during normal operation of the machine.

In describing the preferred method of the present invention, reference will first be made to FIGS. 1 and 2 of the drawings which illustrate a random wound coil that was manufactured by the novel process disclosed herein. At the outset it should be understood that although only one coil will be described hereinafter, a plurality of such coils will normally be used in combination to form a conventional inter-connected winding for a dynamoelectric machine in any well-known manner. Moreover, it is not necessary to an understanding of the invention to depict an entire dynamoelectric machine core member, such as a conventional slotted stator, therefore, only a fragment of such a machine showing one slot therein is illustrated in FIG. 2 of the drawings. Of course, as is well-known in the electric motor art, a plurality of such slots will normally be disposed in equally spaced-apart relationship around the circumference of a motor stator.

In practicing the invention disclosed herein, a conventional dynamoelectric machine stator core must first be provided. The stator core typically will have a rotor-receiving bore therein and a plurality of axially extending open slots in the core member circumferentially spaced around the bore. A portion of such a stator core 1 is shown in FIG. 2 and two of the axially extending slot tubes (7) formed in the core pursuant to the present invention are shown therein.

Next, a plurality of random wound coils of insulated magnetic wire are provided by any well-known winding means. One such coil 3 is illustrated in FIG. 1 of the drawings. As shown, coil 3 has a pair of connecting leads 4 and 5 that comprise the opposite ends of the coil. In this embodiment of the invention, the magnet wire used to form coil 3 is circular in cross-section, but other shapes of wire may be used as will be understood from the following description of the invention. Except for the exposed ends 4a and 5a of the leads 4 and 5, the entire length of the coil 3 is covered with a suitable insulating coating 6 such as a conventional electrical insulating varnish. Pursuant to the present invention, a plurality of elongated, substantially straight sided slot tubes formed of any suitable, well-known insulating material are provided to house the opposite sides of the coil 3. Each of the slot tubes is formed with overlapping longitudinal edges when they are mounted in their assembled position around the sides of the coil 3, as will be described in detail hereinafter. The overlapping edges of the slot tubes are separable to enable one side of the coil 3 to be received into the tubes. One such slot tube 7 is shown on the lower side of the coil 3 in FIG. 1 and a second, substantially identical slot tube 8 is mounted on the opposite side of the coil 3.

Figure 3:
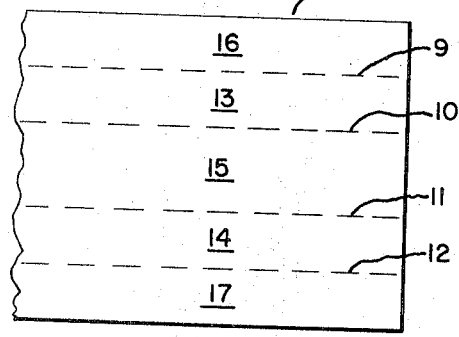
FIG. 3 is a top plan view of a developed, i.e., unrolled, slot tube of the type used in forming the coil of the invention shown in FIG. 1.

In FIG. 3 of the drawings there is shown a developed or unrolled, slot tube 7' that is constructed in a manner similar to that used in making all of the slot tubes (7, 8 etc.). As stated above, the insulating materials used to form the slot tube 7' may be any well-known heat-resistant material such as Nomex, Nomex-Polyimide, Film-Nomex, Nomex-Mylar-Nomex, Dacron Mat-Mylar-Dacron Mat or Mica Laminate. A suitable size sheet of this material corresponding in length to one side of the slots of stator 1 is cut to size and scored, as shown by the dashed lines 9, 10, 11 and 12, to divide the slot tubes into two generally straight-sided walls 13 and 14 and a generally flat bottom wall 15 with two overlapping edge portions 16 and 17. This construction is best illustrated in FIG. 2 of the drawings which shows one end of that side of coil 3 that is surrounded by the slot tube 7. As illustrated, the generally flat walls 13 and 14 and the flat bottom wall 15 conform closely to the substantially straight sides of the stator slot 2, with the bottom wall 15 of the slot tube 7 resting adjacent the bottom of slot 2. It will be noted that the overlapping edge portions 16 and 17 of slot tube 7 abutt the overlapping edges of an adjacent coil that is also mounted in slot 2, thereby to form an extra thickness of imsulation between the two coils. Finally, as is conventional, the coils are secured within the slot 2 by a standard form of dielectric slot wedge 18 that is inserted into pre-formed notches 19 and 20 in the upper sidewalls of the slot 2. As is well-known in the electric motor art, other suitable means for holding the coils in the slot may be used.

Returning now to the description of the manufacturing process of the invention, after a plurality of suitable slot tubes are provided, two of the slot tubes are positioned, respectively, around spaced-apart side portions of each of the coils, such as the coil 3. A suitable porous insulating tape such as that disclosed in the above-mentioned U.S. Pat. No. 3,436,815, or a commercially available type of porous Dacron insulating tape, is then wrapped completely around the end portions 3a and 3b and lead portion 4 and 5 of each of the coils (3). In the preferred embodiment of the invention, the tape wrapped around the end portions 3a and 3b and lead portion 4 and 5 of the coils is lap-wound to assure a continuous covering of the coil end portions. The opposite ends of slot tubes 7 and 8 are secured with their overlapping edge portions (16 and 17) held tightly closed around the side portions 3c and 3d of coil 3 to retain them in a substantially straight configuration within the slot tubes. The respective opposite ends of the tapes 21 and 21' may be secured in position by any suitable means, such as by applying a standard adhesive to the ends thereof.

In one form of the invention, the substantially straight-sided random wound coils thus formed may then be positioned in corresponding slots of the stator 1 and joined to make suitable electrical connections to form a motor winding. Following that step, the wound stator core is vacuum-impregnated with a viscous thermosetting resin having a filler therein, such as that disclosed in the afore-mentioned Sheets patent. Finally, the stator core is heated to set the resin and concomitantly retain the resin inside of the individual coil end portions and within the slot tubes (7 and 8) while draining substantially all of the remainder of the resin from the wound stator core.

Although the above-described form of the invention will, in some applications, provide a suitably insulated stator winding, it has been found preferable to wind the side portions 3c and 3d of the coil 3 with a porous tape to better retain the filled resins, in the manner described in detail in my earlier-mentioned U.S. Pat. No. 3,436,815. Thus, although it will be appreciated that, in some applications of the invention, it is only necessary to provide suitable means to securely hold the overlapping ends of the slot tubes 7 and 8 in their overlapping relationship to tightly enclose the individual magnetic wires of the coil 3 to provide the substantially parallel, straight-sided coil configuration that is afforded by the method of the present invention, a more preferred application of the invention is to wrap the slot tubes with porous tape. Alternatively, if a self-curing glue is placed between the overlapping edges of each of the slot tubes 7 and 8 at the central portions thereof to secure them together, in combination with the securing effect of the extended ends of the tape 21 and 21' on the opposite ends of the tubes 7 and 8 a stiff-sided coil satisfactory for many applications is afforded. However, the coil configuration shown in FIG. 1 has been found to be particularly suitable for ease of handling during the assembly of the resultant coils into a stator, such as the slot 2 of stator 1. With such a wrapping arrangement, it is not necessary to independently secure the butt-wound tapes 22 and 22' in position on the slot tubes 7 and 8, however, it may be desirable in some application of the invention to provide an adhesive on these tapes to render them independently effective to hold the tubes in their tightly closed position around the coil side portions 3c and 3d while the end portions 3a and 3b of coil 3 are wound with tabes 21 and 21', in the manner described above.

Of course, after the slot tubes 7 and 8 are wound in the preferred manner just described, the individual coils are mounted in core slots and encapsulated by the steps described earlier relative to the first embodiment of the disclosed invention.

Figure 4:
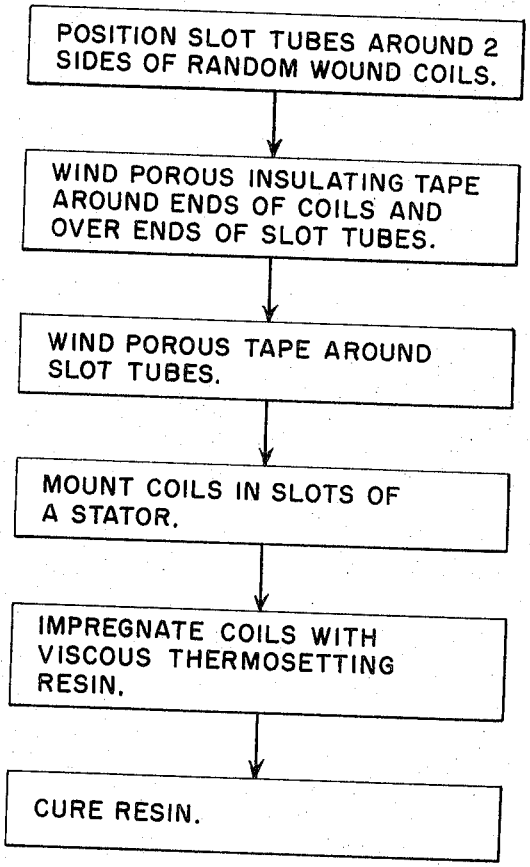
FIG. 4 is a process flow chart indicating some of the main sequential steps in the method of the preferred embodiment of the present invention.

From the foregoing description of various embodiments of the invention, it should be appreciated that there are certain characteristic steps in the disclosed method of the invention that are novel. These characteristics steps are outlined in the flow chart of FIG. 4. Of course, in order to practice the invention, it will first be necessary to provide a suitable dynamoelectric machine core member and random wound coils in the manner set forth initially above, then the steps outlined in FIG. 4 can be followed in the sequence illustrated to practice the invention.

Those skilled in the art will recognize that various alternative embodiments of the invention may be developed from the disclosure of it that is presented herein. Accordingly, it is my intention to define in the following claims the true spirit and scope of the invention.

To use an unfilled viscous thermosetting resin, the porous dacron insulating tape can be treated with a solution which acts as a catalyst for the viscous thermosetting resin. After the coils are taped with the solution, treated tape and the coils are inserted in the slot, the wound stator core is vacuum-impregnated with an unfilled viscous thermosetting resin. Finally, the stator core is heated to set the resin and concomitantly retain the resin inside of the individual coil end portions and within the slot tubes (7 and 8) while draining substantially all the remainder of the resin from the wound stator.

What I claim as new and desire to secure by Letters Patent of the United States is:

1. A process of manufacturing a dynamoelectric machine stator comprising:
   a. providing a stator core having a rotor-receiving bore therein and a plurality of axially extending open slots in said core circumferentially spaced about said bore,
   b. providing a plurality of random wound coils of insulated magnet wire,
   c. providing a plurality of elongated substantially straight-sided slot tubes formed of insulating material, each of said slot tubes being foremd with overlapping longitudinal edges that are separable to enable one side of one of said coils to be received into each tube,
   d. positioning two of said slot tubes, respectively, around spaced-apart side portions of each of said coils,
   e. wrapped porous insulating tape completely around end portions of said coils located, respectively, between said side portions,
   f. securing the overlapping edges of each of the slot tubes positioned around the coil side portions in a position that holds the tubes tightly closed around said side portions to retain them in a substantially straight configuration within the tubes,
   g. positioning said coils in corresponding slots and making suitable connections to constitute a motor winding,
   h. vacuum impregnating said stator core having said motor winding therein with a viscous thermosettable resin,
   i. heating the impregnated stator core to set said resin and concomitantly retaining resin inside said coils by means of said tape and said tubes while draining substantially all of the remainder of said resin from said stator core.

2. An invention as defined in claim 1 including:
   d.-1. positioning the two slot tubes on each coil so that the straight sides of the respective tubes on each coil are substantially parallel to one another before the longitudinal edges of the tubes are secured in their overlapping position.

3. An invention as defined in claim 2 including:
   e-1. wrapping the respective ends of the insulating tapes that are wrapped around the end portions of said coils around the ends of said slot tubes thereby to tightly secure the ends of the tubes in their overlapping relationship.

4. An invention as defined in claim 3 including:
   e-2. placing a self-curing glue between the overlapped edges of each of said slot tubes at the central portions thereof to secure them together.

5. An invention s defined in claim 4 wherein said glue is an air-cured epoxy glue.

6. An invention as defined in claim 4 wherein said central portion of the overlapping edges of said slot tubes comprises at least one-third of the length of said tube.

7. An invention as defined in claim 2 including:
   d-2. wrapping porous insulating tape around each of the slot tubes mounted on said coil side portions, thereby to secure the overlapping edges of the slot tubes tightly closed around the coil side portions.

8. An invention as defined in claim 7 including the step of providing an adhesive on the insulating tape wrapped around each of said slot tubes, thereby to render the tape effective to hold the tubes in said tightly closed position.

9. An invention as defined in claim 7 including wrapping the insulating tape around each of said slot tubes in a butt-winding pattern, and winding the insulating tape around the end portions of said coils in a lap-winding pattern.

10. An invention as defined in claim 9 wherein the butt-wound tape on said slot tubes is applied before the lap-wound tape on the end coils is extended over the ends of the tubes thereby causing it to overlap and secure the ends of the butt-wound tape.

11. An invention as defined in claim 2 including:

c-1. providing each of said slot tubes with generally flat side walls.

12. An invention as defined in claim 11 including:

c-2. providing each of said slot tubes with a generally flat bottom wall.

13. An invention as defined in claim 12 including:

g-1. positioning the coils in said stator slots with the generally flat bottom wall of at least one of the respective slot tubes in each slot being disposed adjacent the bottom of its respective slot.

14. An invention as defined in claim 1 wherein said resin includes a filler material therein, and wherein the pores in said tape are filled with the filler material concomitantly with the vacuum-impregnation of the stator core.

* * * * *